US007976890B2

(12) United States Patent
Etou

(10) Patent No.: US 7,976,890 B2
(45) Date of Patent: Jul. 12, 2011

(54) METHOD OF PRODUCING BODY DEODORIZING GARLIC

(75) Inventor: Hideo Etou, Tokyo (JP)

(73) Assignee: Herbes Japon. Co., Ltd., Tokyo (JP)

( * ) Notice: Subject to any disclaimer, the term of this patent is extended or adjusted under 35 U.S.C. 154(b) by 982 days.

(21) Appl. No.: 10/569,669

(22) PCT Filed: Aug. 28, 2003

(86) PCT No.: PCT/JP03/10958
§ 371 (c)(1),
(2), (4) Date: Feb. 27, 2006

(87) PCT Pub. No.: WO2005/023015
PCT Pub. Date: Mar. 17, 2005

(65) Prior Publication Data

US 2007/0003638 A1 Jan. 4, 2007

(51) Int. Cl.
*A23L 1/221* (2006.01)

(52) U.S. Cl. ........................................ 426/650; 426/443

(58) Field of Classification Search .................. 426/650, 426/443
See application file for complete search history.

(56) References Cited

U.S. PATENT DOCUMENTS

| | | | | |
|---|---|---|---|---|
| 4,911,940 | A * | 3/1990 | Steiner et al. | 426/262 |
| 5,279,827 | A * | 1/1994 | Costello | 424/765 |
| 6,790,464 | B2 * | 9/2004 | Kuok et al. | 424/725 |

FOREIGN PATENT DOCUMENTS

| | | | |
|---|---|---|---|
| CN | 1265282 | | 9/2000 |
| JP | 2265454 | A * | 10/1990 |
| JP | 8-107765 | | 4/1996 |
| JP | 10-248543 | | 9/1998 |
| JP | 11-318379 | | 11/1999 |
| WO | WO00/48475 | | 8/2000 |

OTHER PUBLICATIONS

International Search Report for PCT/JP03/10958 dated Dec. 24, 2003 (1 page).
Patent Abstracts of Japan No. 10-248543 dated Sep. 22, 1998 (14 pages).
Patent Abstracts of Japan No. 11-318379 dated Nov. 24, 1999 (27 pages).
Patent Abstracts of Japan No. 08-107765 dated Apr. 30, 1996 (10 pages).
Chinese Office Action for Chinese Application No. 03826980.5, mailed on Oct. 31, 2008 (5 pages).

* cited by examiner

*Primary Examiner* — Keith D Hendricks
*Assistant Examiner* — Jyoti Chawla
(74) *Attorney, Agent, or Firm* — Osha • Liang LLP

(57) ABSTRACT

An herb liquid is sprayed into peeled garlic, after which the garlic is subjected to a predetermined processing. The herb liquid is produced from at least one type of herb selected from each of the following groups A, B, C, and D: Group A: sweet basil; bush basil; lemon basil; licorice basil; cinnamon basil; dark opal and catmint, Group B: spearmint; apple mint; peppermint; catmint; orange mint; curry mint; north mint; ginger mint; bergamot mint; pennyroyal; summer savory and winter savory, Group C: parsley; sage; red sage; clary sage; and pineapple sage, and Group D: fennel; Florence fennel; true fennel and dill.

6 Claims, No Drawings

METHOD OF PRODUCING BODY DEODORIZING GARLIC

CROSS-REFERENCES

The present invention relates to a method of producing body deodorizing garlic, and body deodorizing garlic produced by this production method.

BACKGROUND

There has been known body deodorizing garlic which controls unpleasant garlicky smell exuding from the body after ingestion, while, as a food, containing the flavor and nutrients no different from traditional fresh garlic (Japanese Patent Application Laid-Open No. H8-107765).

The body deodorizing garlic is produced by grinding and blending at least one type of herb selected from each of the following groups A, B, C, and D, and adding water appropriately to the herb to obtain an herb liquid, into which pealed garlic cloves are entirely pickled for a certain period of time. Thereafter, the garlic cloves are removed from the herb liquid, packaged, and prepared for delivery.

Group A: sweet basil; bush basil; lemon basil; licorice basil, cinnamon basil; dark opal; cat mint, Group B: spearmint; apple mint; peppermint; cat mint; orange mint; curry mint; north mint; ginger mint; bergamot mint; pennyroyal; summer savory; winter savory, Group C: parsley; sage; red sage; clary sage; pineapple sage, Group D: fennel; Florence fennel; true fennel; dill.

However, in the conventional method of producing body deodorizing garlic, since a garlic clove is pickled in an herb liquid, the active ingredients of garlic could be released into the herb liquid. The problems, therefore, were that the flavor of the garlic was reduced, and mold would be formed on the garlic, depending on the season. Furthermore, [the conventional method] not only involves effort to process the herb liquid after the garlic clove is pickled, but also wastes the herbs.

An object of the present invention, therefore, is to provide a method of producing body deodorizing garlic which does not cause such problems, and to provide the body deodorizing garlic.

SUMMARY

The present invention is characterized in producing body deodorizing garlic by spraying an herb liquid into peeled garlic. Forms of garlic applied in the present invention include a peeled garlic clove, a minced garlic clove, sliced garlic, and grated garlic. The herb liquid may be sprayed into the garlic clove, or into the minced garlic or the like after a predetermined processing is carried out. The garlic clove sprayed with the herb liquid may be sliced or subjected to other processing, or may be sprayed with the herb liquid after processing. After spraying the garlic clove with the herb liquid, the garlic is dried for a predetermined period of time and immersed in the herb liquid. The garlic may be dried as is, or may be left wet with the herb liquid without drying. The garlic is let dry preferably at room temperature or at normal temperature, but the garlic sprayed with the herb liquid may be stored in a warming oven or heating oven to forcibly dry the garlic. The necessary amount of the herb liquid can be applied in one spray or a plurality of sprays. In the case of obtaining dryness of the garlic, the garlic can be dried, followed by spraying with the herb liquid, or dried garlic can be dried again, followed by spraying with the herb liquid.

The herb liquid is produced by grinding and blending at least one type of herb selected from each of the following groups A, B, C, and D, and adding water appropriately to the herb.

Group A: sweet basil; bush basil; lemon basil; licorice basil, cinnamon basil; dark opal; cat mint.

Group B: spearmint; apple mint; peppermint; cat mint; orange mint; curry mint; north mint; ginger mint; bergamot mint; pennyroyal; summer savory; winter savory.

Group C: parsley; sage; red sage; clary sage; pineapple sage.

Group D: fennel; Florence fennel; true fennel; dill.

Further, a preferable result can be obtained by adding at least one type of herb selected from the following group E.

Group E: rosemary; thyme; chervil; caraway; oregano; sweet marjoram; nell; chervil; comfrey; cress; marjoram.

DETAILED DESCRIPTION

Embodiments of the present invention are described next. First of all, a method of preparing an herb mixture used in the present invention is described. An example of the herb formulation (mixing ratio of a plurality of herb solutions) used is as follows. Numeric figures next to the herbs indicate the amount of an extraction solution (in liters (or kilograms)) of each of the herbs contained in the herb mixture (total of 17 liters (or kilograms)).

| Herb liquid A | |
|---|---|
| Group A: Lemon basil | 3 |
| Group B: Apple mint | same as above |
| Group B: Ginger mint | same as above |
| Group C: Clary sage | 2 |
| Group D: Fennel | 3 |
| Group E: Marjoram | same as above |
| **Herb liquid B** | |
| Group B: Cat mint | 4 |
| Group B: Orange mint | 2 |
| Group C: Parsley | 3 |
| Group D: Fennel | 4 |
| Group D: Dill | same as above |
| **Herb liquid C** | |
| Group A: Bush basil | 4 |
| Group B: Curry mint | 3 |
| Group C: Sage | same as above |
| Group E: Marjoram | 4 |
| Group E: Thyme | 3 |

The herbs are washed thoroughly with running water after harvesting. The washed herbs are processed by being immersed in hypochlorous acid (with the residual chlorine concentration of 200 ppm) solution three times. The processed herbs are then processed in a dehydrator, and thereafter drained in a colander for drying. The herbs are then shredded.

Four-liter water (distilled water) is added to each 1.7 kg-batch of herbs. The water is added in two additions. In other words, two-liter water is added to 800 grams to 1 kg of herbs first, which is then mixed in blender for 15 to 20 seconds. Next, the rest of the herbs and the water are added to the blender and mixed at high speed for 40 to 50 seconds in the same manner as above.

The mixture is poured into a barrel, which is then let stand for 24 hours. Thereafter, the liquid solution from which the active ingredients of the herbs are extracted is roughly squeezed, strained through a filter cloth, and poured into a container. These steps are performed under normal temperature.

Thus obtained each herb liquid is poured into a 200-liter container and stored in a refrigerator and cooled at approximately 0 degree. The container is shaken up and down approximately once a week during the storage period so that precipitate does not settle at the bottom [of the container]. The precipitate is dumped several times during [the storage period]. The herb mixtures (formulation examples A through C) are obtained through approximately two-month storage in the manner described above.

The herb liquid is poured into an injector, and then sprayed into peeled garlic. 10 to 20 cc of the herb liquid is sprayed into 1 kg of garlic. Spraying is performed in the form of a mist or steam. Next, the garlic cloves into which the herb [liquid] is sprayed are dried in warm air at 50 to 70 C.° for 30 to 60 minutes. [The garlic cloves] may be dried naturally. This processing therefore is the method of producing the garlic cloves.

In the case of a dried [garlic] product, a peeled garlic cloves is sliced, dried at 60 to 70 C.° for 1 to 3 hours, sprayed with the herb liquid, and then dried in warm air at 50 to 70 C.° for 30 to 60 minutes. [The garlic clove] may be ground or reduced to a powder if necessary. In the case of a fried [garlic] product, slices of dried garlic sprayed with the herb liquid may be fried in oil.

Sensory Test of Garlic

A raw garlic [clove] and a garlic clove sprayed with the herb [liquid] are grated, 5 grams of garlic is spread on a slice of six-sliced loaf bread, and [several] individuals consume the slice of bread. The oral odors of the individuals are compared in the sensory test shortly after, thirty minutes after, one hour after, three hours after, and five hours after the consumption [of the garlic].

There are six individuals who consume the garlic, and they are in good health and do not smoke. Thirty people make the same evaluation by smelling liquid with a strong smell and liquid with a weak smell which are created by diluting methylcaptan (has a smell similar to garlic).

Test Method

The garlic is grated by means of a ceramic grater, 5 grams of which is weighed for each person shortly after grating [the garlic], spread on a slice of six-sliced loaf bread, and consumed. (There are six individuals.) It should be noted that of the six individuals, three consume the raw garlic and the other three consume the garlic sprayed with the herb liquid. Immediately after, thirty minutes after, one hour after, three hours after, and five hours after [the consumption of the garlic], plastic bags are filled with breaths [of the individuals], which are then smelled [by those making evaluations]. (6 individuals smell the breaths.) When smelling the breaths, the evaluators are allowed to wear eye masks in order to avoid the subjectivity of judgments, and the evaluators are allowed to rest for two to five minutes after each smelling action.

Six types of odors are numbered in order of strength of the smells to create scores. However, if a difference cannot be detected by any possibility, the same number is applied.

Level of smells . . . (weak) 1<2<3<4<5<6 (strong)

Evaluation Method

Of the six individuals who have consumed the garlic, those who have consumed the raw garlic are categorized as A, B, and C, and those who have consumed the garlic sprayed with the herb liquid are categorized as D, E, and F. The average and variability of the odors are obtained for the evaluated six individuals. An individual with the least variability among is selected from A through C and D through E respectively to obtain a data value.

The same measurement is performed thirty minutes after, one hour after, three hours after, and five hours after [the consumption of the garlic] to obtain data values. However, only data indicating whether the raw garlic or the garlic sprayed with the herb liquid has a strong smell is obtained, and data indicating that [the oral odors] are eliminated in time cannot be obtained. Therefore, as a result of recording “whether smell is detected or not” in “barely<slightly<a little<smelly<smellier” for each estimation time, it can be considered that the levels of the smells of the garlic are reduced as a whole such that [the smell of the garlic] immediately after [the consumption of the garlic] is numbered 1, thirty minutes after is 5%, one hour after is 10%, three hours after is 15%, and five hours after is 20%.

In the manner described above, the sensory test of the garlic is performed five times by dividing the thirty panelists into five groups, each containing six people, whereas the six individuals consuming [the garlic] are remained as is. The average of the five evaluations are obtained and taken as the result data (Table 1) of the present sensory test the garlic.

TABLE 1

| | Raw garlic | Garlic sprayed with herb liquid |
|---|---|---|
| Immediately after | 3.4 +/− 0.3 | 3.6 +/− 0.3 |
| 30 min after | 4.4 +/− 0.3 | 3.1 +/− 0.3 |
| 1 hr after | 3.8 +/− 0.7 | 2.2 +/− 0.7 |
| 2 hrs after | 4.2 +/− 0.7 | 2.8 +/− 0.7 |
| 3 hrs after | 4.2 +/− 0.8 | 2.0 +/− 0.3 |

According to the above results, in the case of consuming the garlic sprayed with the herb liquid, it is clear not only that the flavor of the garlic is not diminished but also that the smell of the garlic after consumption is reduced.

Next, a garlic clove sprayed with the herb liquid and packed in a polyethylene resin bag, and a garlic clove which is immersed in the herb liquid and then removed is packed in a polyethylene bag are stored under room temperature for three days in a refrigerator for month. Thereafter, [these garlic cloves] are consumed by trial subjects, as a result of which [the trial subjects] received the impression that in summer the flavor of the latter garlic is distinctly weaker than the smell of the former garlic.

According to the present invention, the body deodorizing garlic can be produced by simply spraying garlic into the herb liquid, thus there are advantages that the herb liquid is not wasted and a large amount of herbs are not required. Moreover, [the present invention] has an effect that the flavor of the garlic is not lost through a whole year.

It should be noted that, as the method of producing the herb liquid, the herb liquid (mixture of herbs) may be produced by creating a concentrate solution of each of the herbs, and mixing the herb solutions before spraying into a garlic clove.

I claim:

1. A method of producing a body deodorizing garlic, comprising:

selecting at least one type of herb from each of the below groups A, B, C, D, and E;

under ambient temperature, washing each of the selected herb thoroughly with running water after harvesting;

treating each of the washed herbs in a dehydrator and thereafter drying it;

shredding each of the herbs;

adding water to each of the herbs in two additions:

first adding some water to some of the shredded herb and mixing it in a blender;

then adding the rest of the water and the herb to the blender and mixing;

pouring each of the mixtures into a container;

letting the mixture stand for at least 24 hours;

after the at least 24 hours, storing each of the containers in a refrigerator at approximately 0° C. for two months;

shaking up each of the mixtures approximately once a week during the two month storage period and dumping precipitate several times during the storage period so that the precipitate does not settle;

mixing the respective, stored liquid solutions to obtain a herb mixture liquid;

pouring the herb mixture into an injector;

slicing a peeled garlic clove and drying it at 60 to 70° C. for 1 to 3 hours;

spraying the herb mixture liquid over the sliced garlic clove;

drying the sliced garlic clove in warm air at 50 to 70° C. for 30 to 60 minutes;

wherein the groups comprise:

Group A: sweet basil, bush basil, lemon basil, licorice basil, cinnamon basil, and dark opal;

Group B: spearmint, apple mint, peppermint, cat mint, orange mint, curry mint, north mint, ginger mint, bergamot mint, pennyroyal, summer savory, and winter savory;

Group C: parsley, sage, red sage, celery sage, and pineapple sage;

Group D: fennel, Florence fennel, true fennel, and dill; and

Group E: rosemary, thyme, chervil, caraway, oregano, nell, comfrey, cress, and marjoram.

2. A body deodorizing garlic produced by the method according to claim 1.

3. The method of producing a body deodorizing garlic according to claim 1, wherein the sliced garlic clove sprayed with the herb liquid and dried is fried in oil.

4. The method of producing a body deodorizing garlic according to claim 1, wherein the sliced garlic clove sprayed with the herb liquid and dried is ground or reduced to a powder.

5. A body deodorizing garlic produced by the method according to claim 4.

6. A body deodorizing garlic produced by the method according to claim 3.

* * * * *